United States Patent
Johnson et al.

(10) Patent No.: US 9,637,620 B2
(45) Date of Patent: May 2, 2017

(54) PREPARATION OF REFINED PIGMENT FROM ELASTOMER

(71) Applicant: Sun Chemical Corporation, Parsippany, NJ (US)

(72) Inventors: Steven Johnson, Fairfield, OH (US); John Nimmo, Kent (GB); Mike Venturini, Macungie, PA (US)

(73) Assignee: Sun Chemical Corporation, Parsippany, NJ (US)

( * ) Notice: Subject to any disclaimer, the term of this patent is extended or adjusted under 35 U.S.C. 154(b) by 65 days.

(21) Appl. No.: 14/802,572

(22) Filed: Jul. 17, 2015

(65) Prior Publication Data

US 2015/0322247 A1 Nov. 12, 2015

Related U.S. Application Data

(63) Continuation of application No. PCT/US2014/017694, filed on Feb. 21, 2014.

(60) Provisional application No. 61/768,064, filed on Feb. 22, 2013.

(51) Int. Cl.

| C08L 9/06 | (2006.01) |
| C08F 136/08 | (2006.01) |
| C08F 36/06 | (2006.01) |
| C08F 36/04 | (2006.01) |
| C08L 7/00 | (2006.01) |
| C08L 23/16 | (2006.01) |
| C08L 61/00 | (2006.01) |
| C09D 119/00 | (2006.01) |
| C09D 121/00 | (2006.01) |
| C08L 61/06 | (2006.01) |
| C08L 77/00 | (2006.01) |
| C09D 161/06 | (2006.01) |
| C09D 177/00 | (2006.01) |

(52) U.S. Cl.
CPC ............... *C08L 9/06* (2013.01); *C08F 36/04* (2013.01); *C08F 36/06* (2013.01); *C08F 136/08* (2013.01); *C08L 7/00* (2013.01); *C08L 23/16* (2013.01); *C08L 61/00* (2013.01); *C08L 61/06* (2013.01); *C08L 77/00* (2013.01); *C09D 119/003* (2013.01); *C09D 121/00* (2013.01); *C09D 161/06* (2013.01); *C09D 177/00* (2013.01); *C08K 2201/003* (2013.01); *C08K 2201/005* (2013.01)

(58) Field of Classification Search
CPC ..... C09D 119/003; C09D 121/00; C08L 9/06; C08L 61/00; C08L 7/00; C08L 23/16; C08F 36/04; C08F 36/06; C08F 136/08; C08K 2201/003; C08K 2201/005
USPC ................................................ 525/185, 332.5
See application file for complete search history.

(56) References Cited

U.S. PATENT DOCUMENTS

| 4,196,259 | A | * | 4/1980 | Augustin | ................. | C09D 5/00 |
| | | | | | | 427/385.5 |
| 4,535,941 | A | | 8/1985 | Brubaker et al. | | |
| 4,625,922 | A | | 12/1986 | Brubaker et al. | | |
| 5,238,194 | A | | 8/1993 | Rouse et al. | | |
| 5,411,215 | A | | 5/1995 | Rouse | | |
| 5,564,634 | A | | 10/1996 | Rouse et al. | | |
| 6,333,373 | B1 | | 12/2001 | Rouse et al. | | |
| 6,521,706 | B1 | | 2/2003 | Desai et al. | | |
| 7,445,170 | B2 | | 11/2008 | Cialone et al. | | |
| 7,649,044 | B2 | | 1/2010 | Czornij et al. | | |
| 7,654,477 | B2 | | 2/2010 | Tirelli et al. | | |
| 7,816,446 | B2 | | 10/2010 | Shahidi et al. | | |
| 8,013,036 | B2 | | 9/2011 | Shahidi et al. | | |
| 2009/0275677 | A1 | * | 11/2009 | Savin | ................. | C09D 119/003 |
| | | | | | | 523/219 |

FOREIGN PATENT DOCUMENTS

| CN | 101293985 | 10/2008 |
| JP | S5764537 | 4/1982 |
| JP | 2000-063674 | 2/2000 |
| WO | WO 2008/036458 | 3/2008 |

OTHER PUBLICATIONS

International Search Report and Written Opinion dated Jun. 11, 2014 for Application No. PCT/US2014/017694.
Zollinger, H., Color Chemistry—Syntheses, Properties and Applications of Organic Dyes and Pigments, Second-revised Ed., 1991, Weinheim, New York, 4 pgs.

* cited by examiner

*Primary Examiner* — Frances Tischler
(74) *Attorney, Agent, or Firm* — Frost Brown Todd LLC

(57) ABSTRACT

A pigment and method for making a pigment comprising a milled elastomer, wherein the milled elastomer has a D50 particle size of between about 5 and about 50 microns. A coating of the pigment has a smoothness of about 3 or less. The pigment is prepared by providing an elastomer; and milling the elastomer in the presence of milling media and solvent at a temperature from about 30° C. to about 70° C. The elastomer is insoluble in the solvent. The method for preparing the pigment from an elastomer comprises the steps of: providing an elastomer; and milling the elastomer in a media mill in the presence of milling media and solvent at a temperature from about 30° C. to about 70° C. The diameter of the milling media is from about 0.5 mm to about 10 mm, and the elastomer is insoluble in the solvent.

20 Claims, 4 Drawing Sheets

PREPARATION OF REFINED PIGMENT FROM ELASTOMER

CROSS REFERENCE TO RELATED APPLICATIONS

This application hereby claims the benefit of PCT/US2014/017694, filed on Feb. 21, 2014, which claimed benefit of the provisional patent application of the title "Preparation of Refined Pigment from Post-Consumer Waste Crumb Rubber," Ser. No. 61/768,064, filed on Feb. 22, 2013, the disclosure of which is hereby incorporated by reference in its entirety.

BACKGROUND

Vulcanized rubber products, such as discarded automobile tires can pose a difficult situation when they come to the end of their lifetime. On one hand, the tires can be put into landfill; however, they do not decompose rapidly. On the other hand, chemical decomposition of tires is possible, although the vulcanized rubber is a heavily crosslinked material which can only be broken down using highly aggressive chemical treatments. Thus, alternative solutions are required. One solution would be to recycle vulcanized rubber materials into products with general use in many applications.

One major use of recycled vulcanized rubber is the production of crumb rubber, which is composed of ground particles of rubber that has been separated from other tire components, such as steel and fluff, and has a size distribution in the range of 60-1000 μm. Crumb rubber currently sees major use in rubberized asphalt, and is used as a cushioning material in Astroturf and on playgrounds. For other applications, such as pigment and coating additives, the large particle size of crumb rubber limits its use. For such applications, a particle size of less than 100 μm is generally required and virtually all inclusions, such as steel or glass fibers, must be removed. If the mean particle size is less than 60 μm, it becomes possible to spray particulate rubber samples when using an appropriate paint system and binder.

Methods for decreasing the size of crumb rubber particles which involve cryogenically cooling the material to below or near its glass transition temperature and grinding to break it into smaller particle sizes (U.S. Pat. No. 7,654,477, U.S. Pat. No. 7,816,446, U.S. Pat. No. 8,013,036, and U.S. Pat. No. 7,445,170) are known. However, the size distribution reported in each of these patents is broad, ranging from about 75-1000 μm, and does not render the material appropriate for use as a pigment. Moreover, these patents do not provide a means for removing inclusions, such as steel and glass wool, from the ground material.

Crumb rubber made by cryogenically cooling the feedstock and grinding can produce a final product that can pass through a 140 mesh sieve, corresponding to particles <100 μm (U.S. Pat. No. 7,445,170). However, when such crumb rubber is included in a coating, the coating has a rough appearance, has low hiding power, is less black and has low tint strength. This combination of properties does not render the material appropriate for use as a pigment.

BRIEF SUMMARY

A pigment comprises a milled elastomer, wherein the milled elastomer has a D50 particle size of between about 5 and about 50 microns. A coating of the pigment has a smoothness of about 3 or less. The pigment is prepared by providing an elastomer; and milling the elastomer in the presence of milling media and solvent at a temperature from about 30° C. to about 70° C. The elastomer is insoluble in the solvent.

A method for preparing the pigment from an elastomer comprises the steps of: providing an elastomer; and milling the elastomer in a media mill in the presence of milling media and solvent at a temperature from about 30° C. to about 70° C. The diameter of the milling media is from about 0.5 mm to about 10 mm, and the elastomer is insoluble in the solvent.

These aspects shall be made apparent from the accompanying figures and the description thereof.

BRIEF DESCRIPTION OF THE FIGURES

The accompanying figures, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
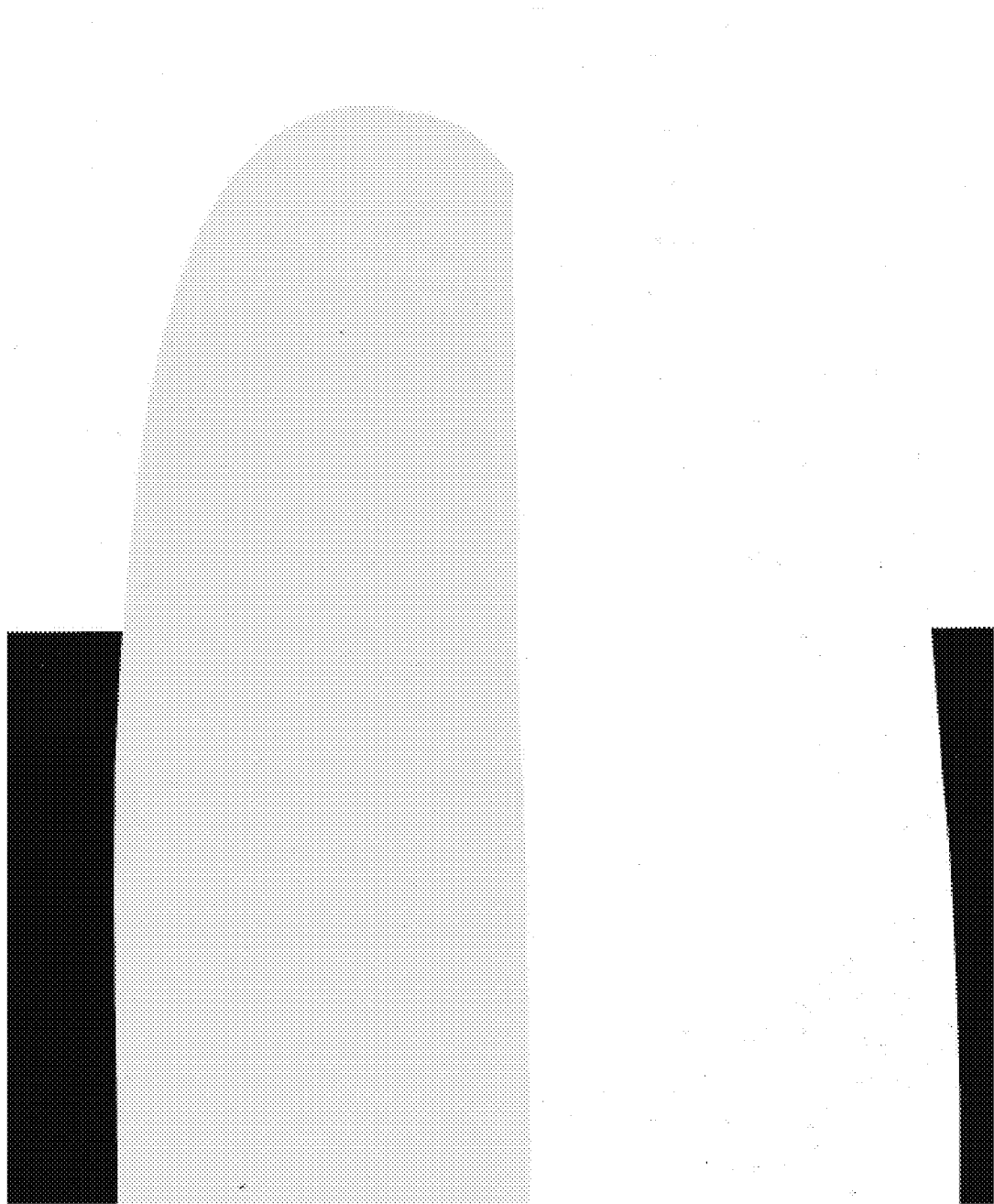
FIG. 1 is a picture of a display of Examples 23A (left) & 23C (right).

The pigment is significantly smaller in particle size than currently available materials, such as those produced by mechanical or cryogenic grinding. As a result, this pigment provides superior qualities like, but not limited to, increased tinting strength, increased gloss, increased blackness, increased hiding power, and increased surface smoothness, which allow it to be used in applications where current pigments made from rubber cannot qualify or are border-line for applicability.

Compared to other elastomer-based pigments, which typically have relatively large diameter and size distribution for the particles (D50=35-1000 microns), the particles of the pigment have a relatively small particle size distribution (for example D50=about 5 to about 50 microns). The use of smaller particles increases the ability to use the pigment in liquid coatings, powder coatings, plastics, and inks.

The Pigment

The pigment comprises a milled elastomer, wherein the milled elastomer has a D50 particle size of between about 5 and about 50 microns. The milled elastomer is pigmentary in nature due to the small particle size and narrow particle size distribution. Accordingly, when the pigment is coated, it has a smooth finish, as measured by optical profilometry, the $R_a$ is less than 3. In addition, coatings of the pigments have excellent hiding power, strong blackness, and high tint strength in comparison to other milled elastomers.

The elastomer may be a manufactured or recycled product. In some embodiments, the elastomer is a recycled elastomer product. For example, discarded automobile tires can be ground to produce crumb rubber. But the elastomer need not be a recycled product. In some embodiments, the elastomer is vulcanized rubber, such as from natural rubber, styrene-butadiene rubber (SBR), or ethylene propylene diene monomer (EPDM). The vulcanized rubber may be colored or colorless. In some embodiments, the elastomer is selected from acrylonitrile-butadiene rubber, hydrogenated acrylonitrile-butadiene rubber, ethylene propylene diene rubber, fluorocarbon rubber, chloroprene rubber, silicone rubber, fluorosilicone rubber, polyacrylate rubber, ethylene acrylic rubber, styrene-butadiene rubber, polyester urethane/polyether urethane, natural rubber, and combinations thereof.

The median particle size (D50) of the pigment is between about 10 and about 50 microns. In some embodiments the average particle size is between about 10 and about 40 microns, about 10 and about 30 microns, about 10 and about 20 microns, or about 10 and about 15 microns. In some embodiments, the maximum particle size is no more than about 100 microns, about 90 microns, about 80 microns, about 70 microns, about 60 microns, or about 50 microns.

The pigment has a narrow particle size distribution, which is the range of particle sizes. In some embodiments, the difference in D10 to D90 is about 60 microns or less, about 50 microns or less, about 40 microns or less, about 30 microns or less, about 20 microns or less, or about 15 microns or less.

In some embodiments, the pigment is low in impurities such as metals and glass. Recycled crumb rubber often has other ingredients besides elastomers. For example, recycled crumb rubber from tires includes iron and other metals. In some embodiments, the pigment has less than about 3% by weight of each of iron, manganese, and zinc. In some embodiments, there is less than about 2%, or less than about 1% of each of these metals.

Use of the pigment in coatings produces high tint strength compared to other forms of ground rubber, which means that only a relatively small amount of the pigment is needed to alter the color of the paint base. In this case, tint strength can be measured as L* when the pigment is put into a white paint base. In some embodiments, the pigment has a black color and the L* of a coating of the pigment is about 80, about 80 or less, about 82, or about 82 or less.

Use of the pigment in coatings also produces high hiding power, or opacity. This can be measured by coating the pigment over a black and white card and measuring the thickness of the coating at which there is no visual difference between the black and white areas of the card. A thinner coating will have a higher hiding power. In some embodiments, the film thickness at full hide is about 0.6 Mils, or about 0.6 Mils or less.

Process of Making the Pigment

The pigment is prepared by media milling crumb rubber in the presence of milling media and solvent. This milling process makes a pigment with a narrow size distribution and a set of properties that are wholly different than existing crumb rubber additives. Subsequent processing allows the removal of metal and glass particles.

In some embodiments, the crumb rubber is made from a recycled vulcanized rubber product. The origin of the crumb rubber is not important and can originate from tractor-trailer tires, passenger vehicle tires, and other vulcanized rubber sources known to those in the art. Additionally, the crumb rubber can be either a homogeneous material or a heterogeneous composite that contains inclusions of steel, metal, glass, and any other material included in the raw material used to produce the crumb rubber. The crumb rubber may be colorless or colored, but is not limited to, a color from the following group: black, white, brown, orange, red, blue, yellow, green, and violet. In some embodiments the crumb rubber is black. The crumb rubber does not necessarily have to come from a recycled vulcanized material and can be in an unused state.

In some embodiments, the crumb rubber used to produce the pigment typically has a median particle size (D50) of 300±25 μm and a size distribution of about 1.0 to about 595 microns based on the D10 to D90 cumulative values, respectively, and can pass through a sieve of 30 mesh or smaller. In some embodiments, the crumb rubber has a median particle size (D50) of 116±10 microns and a size distribution of from about 1.0 to about 177 microns based on the D10 to D90 cumulative values, respectively, and can pass through a sieve of 80 mesh or smaller.

The crumb rubber is subjected to media milling in any type of mill suitable for this type of milling and known to those skilled in the art, including, but not limited to, ball mills, attritor mills, high-speed ball mills, stirred ball mills, vibratory mills, and small media mills in both vertical and horizontal configurations. In some embodiments, the crumb rubber is milled using a high-energy mill. In some embodiments, the crumb rubber is milled using a vertical, high-speed ball mill attritor containing a rotating arm therein.

The crumb rubber is milled in the presence of media. In some embodiments, the density of the media used to mill the raw crumb rubber is about 2 g/cm$^3$ to about 15 g/cm$^3$, such as about 2.5 g/cm$^3$ to about 15 g/cm$^3$, about 5 g/cm$^3$ to about 15 g/cm$^3$, about 7 g/cm$^3$ to about 15 g/cm$^3$, about 5 g/cm$^3$ to about 10 g/cm$^3$, and about 5 g/cm$^3$ to about 7 g/cm$^3$. In some embodiments, the media comprises the following materials: stainless steel, carbon steel, glass, silicon carbide, cerium zirconium oxide, magnesium zirconium oxide, yttrium zirconium oxide, fused zirconium silica, ceramic, and mixtures thereof. In some embodiments, the media is steel.

The shape of the media may be: spherical balls, elliptical balls, cylinders/diagonals, ballcones/satellites, and mixtures thereof. In some embodiments the shape of the media is spherical. In the case of spherical media, the diameter of the media is in the range of about 0.5 mm to about 10 mm, such as about 1 mm to about 10 mm, about 2 mm to about 10 mm, about 2 mm to about 8 mm, about 2 mm to about 6 mm, about 4 mm to about 10 mm, about 4 mm to about 8 mm, or about 4 mm to about 6 mm. The media may be homogeneous in shape or can be a mixture of shapes, sizes and materials.

The crumb rubber is milled in the presence of a solvent. The crumb rubber should be insoluble or minimally soluble in the solvent. In some embodiments, the crumb rubber does not swell or swells minimally in the solvent. Illustrative examples of solvents that may be used during the milling of the crumb rubber are exemplified by, but are not limited to, water, ethanol, n-propanol, 1-propanol, isopropanol, 1-butanol, 2-butanol, n-butanol, ethylene glycol, Butyl Cellosolve™ (ethylene glycol mono butyl ether), ethyl acetate, butyl acetate, dimethylformamide, dimethyl sulfoxide, and mixtures thereof. In some embodiments, the crumb rubber is milled in the presence of a solvent selected from n-butanol, isopropanol, ethylene glycol, and diethylene glycol.

Typically, crumb rubber, solvent, and milling media are added to a mill in the range of about 25 to about 95% of the mill volume, such as about 40 to about 90%, or about 50 to about 85% of the mill volume. However, these amounts are not required. In some embodiments, the pigment is formed by continuously adding crumb rubber, solvent, and milling media to a mill while removing a mixture comprising the pigment. In some embodiments, the ratio of media to the crumb rubber is in the range of about 35 to about 45% by weight. In some embodiments, the ratio of solvent to the crumb rubber is in the range of about 0.5 to about 5.0% by weight, such as in the range of about 1.5 to about 3.0% by weight.

The temperature during this milling is about 30 to about 70° C., such as about 30 to about 70° C., about 30 to about 60° C., about 30 to about 50° C., about 30 to about 40° C., about 35 to about 50° C., about 40 to about 70° C., about 40 to about 60° C., and about 50 to about 60° C. Typically, the temperature should not be above the boiling point of the solvent.

In some embodiments, the process of making the pigment is through the use of a vertical, high-speed ball mill attritor mill containing a rotating arm. The crumb rubber is milled for about 5 to about 20 hours, depending on the type and amount of media, solvent, and the speed of the mill. The speed of the mill is generally determined by the mill size, type of media, and loading of the mill. For example, it can be 500 revolutions per minute (rpm) for a 1.5 gallon mill charged with 1 gallon of 3 mm spherical steel media. The temperature of the mill is maintained at or slightly higher than room temperature. Optimal milling temperature depends on safe operation of the solvent and may be in the range of about 30 to about 70° C., though temperatures outside this range would still be possible. In some embodiments, the milling temperature is set so that re-aggregation of the crumb rubber particles does not occur.

As milling progresses, the viscosity may increase. In this case, additional solvent may be added to maintain the fluidity. The additional solvent may or may not be different from the initial solvent. At the conclusion of the milling cycle, the pigment is discharged from the mill. The discharge of the product may take several forms: direct discharge for use as finished dispersion product or diluted discharge to provide for additional processing steps.

In some embodiments, crumb rubber is milled in the presence of a resin. The resin may be soluble in the solvent used during the milling. Illustrative examples of resins that may be used during the milling of the crumb rubber are polymeric, such as, but not limited to, water-soluble acrylics, acrylics, silicones, polyurethanes, polyesters, polyamides, cellulose or nitrocellulose polymers, hydrocarbons, phenolics, and combinations thereof. In some embodiments, the molecular weight of the polymer resin ranges typically from about 1,000 to about 10,000 daltons, but is not restricted to this range. The amount of resin used may range from 0% to about 70% by weight of elastomer. The resin may be a film forming, non-film forming, or a polymeric dispersant resin.

In some embodiments, after milling, the pigment is subjected to various processes to remove any metallic and/or glass impurities present in the crumb rubber. Subsequent processes may be employed to prepare the pigment for use in various types of coating applications. The types of post-milling processing steps include, but are not limited to, sieving, filtering, washing, and magnetic separation. Other post-treatment operations known to those skilled in the art can also be performed. For example, the transfer of the resulting pigment via the technique known as "flushing" from water-based presscake to an organic phase, which may be, but not limited to, organic solvents, polyethylene waxes, solid resins or oleo-resinous products containing organic moieties, constitutes one of those post-treatment operations.

Coating Compositions

When coated, the pigment displays a smooth finish, higher tint strength, and better hiding power when compared to other crumb rubber pigments. In addition, the coatings generally have a matte appearance, which is desirable for certain applications.

The smoothness of a coating can be an appealing feature for a consumer. So a coating that is smoother may be more desirable. The smoothness of a coating may be measured by optical profilometry. In some embodiments, the smoothness of a coating of the pigment, as measured by the technique described herein, is about 3 or less, such as about 2.5 or less, about 2 or less, about 1.5 or less, or about 1 or less.

The viscosity of a coating before it dries can affect how the coating is applied and its appearance. The viscosity of a coating can be affected by the pigment in the coating. In some embodiments, the viscosity of a coating of the pigment, as measured by the technique described herein, is about 5000 cPs or less, such as about 4000 cPs or less, about 3000 cPs or less, about 2000 cPs or less, or about 1500 cPs or less, when measured at a pigment to binder level of 0.25.

In some embodiments, coatings are obtained by blending the pigment into a paint or ink base. Both water and organic solvent-based systems can be used as the paint or the ink. The coating system may also be UV-curable. In some embodiments, the coatings are air or electrostatically sprayed. When air sprayed, the coating typically has an achromatic, matte black appearance that may be desirable for a number of coating applications.

In some embodiments, the content of the pigment in the coating composition is about 0.1% to about 35% by weight of the coating, such as in the range of about 1% to about 25% by weight the coating.

A coating composition may be obtained by blending the pigment with a coating resin. In some embodiments, the resin is one that is compatible with coatings or ink systems. Examples of resins include, but are not limited to, polyester, polyurethane, polyvinyl, cellulose, polyamide, nitrocellulose, acrylic, alkyd, fluorinated resins, or the like. Specific examples include Laropal® A-81 (aldehyde and ketone resin from BASF) and Tego® Variplus TC (from Evonik). The resin may be a film forming, non-film forming, or a polymeric dispersant resin.

In some embodiments, other colored organic or inorganic pigments, effect pigments, metallic pigments, extenders or dyes can be employed in addition to the pigment described herein. Illustrative examples of the colored pigment include, but are not limited to, phthalocyanines, iron oxides, quinacridones, perylenes, isoindolines, azo lakes, chrome yellows, carbon black, and titanium dioxide. Illustrative examples of the effect pigment include flake-form pigments of interference pigments of all types, such as, but not limited to, pearlescent mica, aluminum, brass, copper, silica, aluminum oxide, and the like.

In some embodiments, additives known for use in coatings may be added to the coating. These additives include, but are not limited to, water, organic solvent (to form a solution, emulsion, or dispersion), interfacial active agents, hardeners, ultraviolet absorbers, thickeners, surface functional additives, surfactants, and other additives known to those in the art.

When forming a film with a coating composition comprising the pigment, the film can be deposited onto a base coat layer or the like, while a top coat layer may be further formed on the film prepared for the coating composition.

The pigments may be used in automotive coatings and other applications.

Other Applications

The pigment will have useful application in several areas, both as a pigment for traditional coloration of articles (coatings, inks, plastics, concretes, stuccos, and mortars) but also as a functional additive. Regarding functionality, the pigment may impart hydrophobicity, energy absorption (including sound), matting and texturizing, flexibilizing and stress reduction, aggregate/filler for concrete, sound and vibrational dampening, wallboard, caulks and sealers, and metal absorption (similar to activated carbon).

Of particular usefulness in coatings and inks, in addition to coloration, is the pigment's matting and haptic effects when added to coatings or inks at a pigment to binder (film forming monomer/polymer) ratio (P/B ratio) of about 0.12 and higher. A P/B ratio of about 0.25 has both low gloss and non-burnishing characteristics. Typically matting agents, such as fumed silica, are easily marred/marked and often polish back to a higher gloss. A coating containing the pigment herein is more resistant to marring and polishing. These coatings and inks also have a pleasing texture and have a smooth feel.

In some embodiments, the pigment will impart hydrophobicity and improve moisture barrier properties in coatings. This will have utility in traditional coatings used for corrosion protection of metal and wood, in asphalt sealers, for maintenance coatings, etc., but also as an additive in poured concrete, concrete block & siding and as a component in gypsum wallboard for wet area applications, below grade installations, moist environments (baths), flood prone areas, etc.

In some embodiments, the pigment may be used as an energy absorbing or stress relieving device in coatings and building materials to reduce chipping, cracking and delamination. When used in a primer or topcoat, it may reduce chipping as a result of stone impact like those seen on the facias and rocker panels of transportation vehicles. In some embodiments, the pigment may be used as a primer or topcoat for wood substrates (interior, exterior, and flooring) to allow the coating to respond to expansion and contraction of the substrate to reduce cracking and splitting. It may also be useful to reduce stress and delamination of a coating as a result of thermal/environmental cycling and embrittlement with age.

In some embodiments, the pigment may be used for sound absorption in various coatings. Some examples include coatings for highway noise barriers, undercoatings and cabin coatings for transportation vehicles and in building construction, flooring underlayments, and ceilings/duct work/framing of public spaces. For the latter, the pigment's black color may be particularly advantageous.

Coatings comprising the pigment also may have a shimmering metallic-like appearance under direct sunlight and a flat, black surface without the need for additives.

In some embodiments, surfaces coated with the pigment exhibit resistance to burnishing, have increased chip resistance, improved corrosion resistance, increased flexibility in coatings for wood (which improves splitting and cracking) and reduced heat build/heat gain compared to carbon black based coatings at equal hiding power. In some embodiments, coatings of the pigment can be used as electric and thermal insulators, protective and barrier coatings, roof coatings, anti-corrosion coatings, powder coatings, adhesives, and architectural coatings. These intended uses are not meant to be limiting, the pigment may have other applications.

Coatings made with other crumb rubber pigments are rough, not jet black, and have a low hiding power. In contrast, in some embodiments, the pigments described herein are able to provide coatings having high blackness or other color, excellent hiding power, higher tint strength, and a smooth finish.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Examples 1-9 Dispersion Preparations

A variable speed Union Process Attritor fitted with a 1.5 gallon tank and cooled using water was loaded with 16,400 g of spherical steel media. Solvent (920 g) was added and the mill was run at low speed (200 rpm) while 400 g of crumb rubber was slowly added. Resin, if desired, was also added at this time. The temperature of the mill contents was maintained at 45° C. The speed was increased to a milling speed dependent on the media size and the contents milled to the desired particle size. As the viscosity increased, additional solvent (may be different than initial milling solvent) may have been added to keep the dispersion fluid (typically 400-600 g total in 1 to 4 additions). The milling cycle was ended when the desired particle size (D50) was attained as various applications may require differing particle sizes (D50). The dispersion was then discharged.

The identity of the starting materials, milling conditions and particle size distribution for Examples 1-9 are recorded in Table 1.

Comparative Example 10

The marketed crumb rubber product 80 mesh (reRubber LLC, Ontario, CA, USA). The size distribution is recorded in Table 1.

Comparative Example 11

The marketed crumb rubber product 80 mesh (Edge Rubber, Chambersburg, Pa., USA). The size distribution is recorded in Table 1.

Comparative Example 12

The marketed crumb rubber product 140 mesh (Edge Rubber, Chambersburg, Pa., USA). The size distribution is recorded in Table 1.

Comparative Example 13

The marketed crumb rubber product 200 mesh (Edge Rubber, Chambersburg, Pa., USA). The size distribution is recorded in Table 1.

Comparative Example 14

The marketed crumb rubber product MD-050-TR (Lehigh Technologies, Tucker, Ga., USA). The size distribution is recorded in Table 1.

Comparative Example 15

The marketed crumb rubber product MD-075-TR (Lehigh Technologies, Tucker, Ga., USA). The size distribution is recorded in Table 1.

Tables 1 and 2 illustrate the effectiveness of the process herein in producing material significantly smaller in particle size and of narrower size distribution than other crumb rubber products currently available. All of the examples have lower D50 values than the Comparative Examples.

Particle Size Measurements:

The particle size distributions of all examples were measured on a Cilas Model 1064 particle size analyzer with a laser diode (830 nm, 630 nm) operating at 7 mW, and the Size Expert v9.08 operating software using techniques known to those skilled in the art. The product (0.1 to 0.5 g) was dispersed in 10 g of isopropyl alcohol via sonication for 5 minutes before measurement. The particle size analyzer used isopropyl alcohol as the carrier solvent. All particle sizes are reported as a volume distribution.

with 16,400 g of spherical steel media. Solvent (920 g) was added and the mill was started at low speed (200 rpm). Crumb rubber (400 g) was slowly added to the mill and the sample temperature was maintained at 45° C. The milling speed was increased and the mill was run for 5 to 13 hours. As the viscosity increased, additional solvent (may be different to the initial milling solvent) may have been added to keep the dispersion fluid (typically 400-600 g total in 1 to 4 additions).

After milling was complete, 2000 g of solvent was added and mixed with the dispersion and the mixture was discharged shortly thereafter. The resulting slurry was made

TABLE 1

| Ex. | Starting material | Commercial Product | Milling Media (mm) | Solvent | Mixing Speed RPM | Time (hrs) | Resin | % Resin on Pigment | Particle Size (μm) D10 | D50 | D90 |
|---|---|---|---|---|---|---|---|---|---|---|---|
| Ex. 1 | reRubber | 80 mesh | 2 | IPA | 500 | 13 | Laropal ® A-81 | 20 | 4.9 | 12.2 | 27.7 |
| Ex. 2 | reRubber | 80 mesh | 3 | IPA | 500 | 7.5 | Tego ® Variplus TC | 20 | 5.0 | 11.9 | 22.9 |
| Ex. 3 | reRubber | 80 mesh | 4.3 | IPA | 400 | 7.5 | Tego ® Variplus TC | 20 | 5.0 | 11.9 | 22.9 |
| Ex. 4 | Edge | 80 mesh | 4.3 | IPA | 400 | 7.5 | Tego ® Variplus TC | 20 | 4.4 | 12.2 | 28.0 |
| Ex. 5 | Edge | 140 mesh | 4.3 | IPA | 400 | 7.5 | Tego ® Variplus TC | 20 | 5.5 | 12.6 | 24.4 |
| Ex. 6 | Edge | 200 mesh | 4.3 | IPA | 400 | 7.5 | Tego ® Variplus TC | 20 | 4.8 | 11.7 | 24.6 |
| Ex. 7 | reRubber | 80 mesh | 4.3 | Butyl alcohol | 400 | 7.5 | Tego ® Variplus TC | 20 | 4.6 | 11.9 | 23.5 |
| Ex. 8 | reRubber | 80 mesh | 4.3 | Ethylene Glycol | 400 | 7.5 | Tego ® Variplus TC | 20 | 2.8 | 10.7 | 28.2 |
| Ex. 9 | reRubber | 80 mesh | 4.3 | Butyl Cellosolve ™ | 400 | 7.5 | Tego ® Variplus TC | 20 | 7.7 | 19.2 | 65.4 |
| Ex. 10 | reRubber | 80 mesh | n/a | n/a | n/a | n/a | n/a | n/a | 47.8 | 117.6 | 324.3 |
| Ex. 11 | Edge | 80 mesh | n/a | n/a | n/a | n/a | n/a | n/a | 41.5 | 132.6 | 296.7 |
| Ex. 12 | Edge | 140 mesh | n/a | n/a | n/a | n/a | n/a | n/a | 38.8 | 74.3 | 123.7 |
| Ex. 13 | Edge | 200 mesh | n/a | n/a | n/a | n/a | n/a | n/a | 26.8 | 63.9 | 108.6 |
| Ex. 14 | Lehigh LLC | MD-050-TR | n/a | n/a | n/a | n/a | n/a | n/a | 16.8 | 38.2 | 64.59 |
| Ex. 15 | Lehigh LLC | MD-075-TR | n/a | n/a | n/a | n/a | n/a | n/a | 17.4 | 47.1 | 97.6 |

Table 1 illustrates the reduction in particle size that can be achieved using the milling conditions described in order to refine the commercially available crumb rubber precursors (Comparative Examples 10-15) into the refined milled material in Examples 1-9.

Examples 16-20: Milling & Presscake Preparation

A variable speed Union Process Attritor fitted with 1.5 gallon tank and cooled using ambient city water was charged homogenous by mixing and passed through a 200 mesh vibrating sieve to remove oversized particles and then filtered to make the presscake. As the product was sieved the slurry was passed over a magnet to capture magnetic impurities. The slurry was filtered resulting in a presscake which can be provided as finished product or further processed.

The identity of the starting materials, milling conditions and particle size distribution for Examples 16-20 are recorded in Table 2.

TABLE 2

| Example | Starting material | Starting Size | Media (mm) | Solvent | Mix Speed RPM | Time (hours) | Particle size (μm) D10 | D50 | D90 |
|---|---|---|---|---|---|---|---|---|---|
| Ex. 16 | reRubber | 80 mesh | 3 | IPA | 500 | 7.5 | 3.9 | 10.4 | 22.6 |
| Ex. 17 | reRubber | 80 mesh | 4.3 | IPA | 400 | 7.5 | 3.9 | 10.8 | 24.6 |
| Ex. 18 | reRubber | 80 mesh | 4.3 | water | 400 | 7.5 | 3.3 | 18.1 | 47.6 |
| Ex. 19 | reRubber | 80 mesh | 3 | DEG | 500 | 7.5 | 3.1 | 10.7 | 28.9 |
| Ex. 20 | reRubber | 80 mesh | 4.3 | DEG | 400 | 7.5 | 3.5 | 11.3 | 27.1 |

Table 2 illustrates the reduction in particle size that can be achieved by using the stated milling conditions without resin present for Examples 16-20.

Example 21A

A solid dispersion comprising 50% by weight of the colorant and 50% by weight of the Laropal® A-81 resin (aldehyde and ketone resin from BASF) was prepared in a laboratory kneader (IKA Laboratory Duplex-Kneter) using phase transfer ("flushing") of a water-borne refined rubber presscake from Example 20 mixed with the Laropal® A-81 resin. Water was removed periodically on "breaking", and the product was dried under vacuum @ 25 in. Hg whilst kneading and heating at 100° C., then cooled and discharged.

Example 21B (Comparative)

Comparative Example 13 was processed in the same way as Example 21A to produce Comparative Example 21B.

Example 21C (Comparative)

Comparative Example 14 was processed in the same way as Example 21A to produce Comparative Example 21C.

Example 21D (Comparative)

Comparative Example 15 was processed in the same way as Example 21A to produce Comparative Example 21D.

22A Acrylic Enamel:

The solid dispersion from Example 21A (15.0 g), 66.6 g of DMR 499 acrylic enamel refinish vehicle (PPG Industries, Cleveland, USA), 9.2 g xylene, 9.2 g butyl acetate, and 200 g ⅛" steel shot were added to an 8 oz. jar and shaken for 60 minutes on a Harbil paint shaker to produce Example 22A. The shot was removed and the paint air sprayed on aluminum panels which were then oven dried at 80° C.

Comparative Example 22B

The process from Example 22A was repeated with the material from Example 21B to produce Comparative Example 22B.

Comparative Example 22C

The process from Example 22A was repeated with the material from Example 21C to produce Comparative Example 22C.

Comparative Example 22D

The process from Example 22A was repeated with the material from Example 21D to produce Comparative Example 22D.

Color Measurements:

The color of the sprayed panels from Example 22A and Comparative Examples 22B-D were measured on an X-Rite MA-98 Spectrophotometer using D65/10 light. The reflected L* values measured at an incident angle, with respect to plane normal of 45° and an aspecular angle of) 45° (45°/0° were recorded and the L* and ΔL* values are shown in Table 3.

TABLE 3

| Example | Resin | L* | ΔL* (45°) |
|---|---|---|---|
| Example 22A | Laropal ® A-81 | 5.58 | Control |
| Example 22B (Comparative) | Laropal ® A-81 | 10.65 | 5.07 |
| Example 22D (Comparative) | Laropal ® A-81 | 9.57 | 3.99 |

The data in Table 3 demonstrates that Example 22A is blacker than Comparative Examples 22B and 22D.

Example 23 Measurement of Tint Strength

Acrylic enamel white base (95 g DMR 400, PPG Industries, Cleveland, USA) was weighed into a 4 oz. jar and rotated to coat sides of jar. The paint bases (5 g) from Example 21A, and Comparative Examples 21B-D are added to produce Example 23A, and Comparative Example 23B-D respectively; the jars were sealed and shaken for 15 minutes on a Harbil shaker. Displays were prepared by drawing down using a 0.003" Bird applicator on a piece of black and white cardboard. The displays were dried at 60° C. for 30 minutes, and cooled.

The color of each display was measured on an X-Rite MA-98 Spectrophotometer using D65/10 light. The reflected L* values measured at an incident angle, with respect to plane normal of 45° and an aspecular angle of) 45° (45°/0° were recorded and the results of the tinting test are reported in Table 4. The pigment (Example 23A) has substantially improved tinting strength as shown by the lower L* value and by the large difference in ΔL*, where large positive values denote a much lighter coating and thus weaker tint strength. A picture of a typical display used for this test is shown in FIG. 1. Table 4 shows the results of the tint strength test for the pigment from Example 23A and the crumb rubber from Comparative Examples 23B-D.

TABLE 4

| Example | Resin | L* of tinted material | Tint Strength as ΔL* (45°) |
|---|---|---|---|
| Example 23A | Laropal ® A-81 | 82.19 | Control |
| Example 23B (Comparative) | Laropal ® A-81 | 94.24 | 12.05 |
| Example 23C (Comparative) | Laropal ® A-81 | 94.65 | 12.46 |
| Example 23D (Comparative) | Laropal ® A-81 | 94.99 | 12.80 |

As seen in Table 4, Example 23A has better tint strength than the crumb rubber pigments of Comparative Examples 23B-D. In fact, Comparative Examples 23B-D have nearly identical tint strength properties to each other, despite rather large differences in their average particle size and particle size distribution.

Example 24 Hiding Power (Opacity)

Xylene (24 g) and butyl acetate (24 g) were added to the remaining paint base (50 g) from Examples 22A-D, and hand mixed for 60 seconds to produce Examples 24A and Comparative Examples 24B-D. These examples were used as a paint for spray evaluation of their hiding power. Aluminum panels were sprayed using a standard technique to evaluate hide and to produce panels suitable for measuring coating thickness at full hide and measured with an Oxford Instruments Film Thickness Gage Model CMI233 with ECP probe to determine paint thickness at full hide. Full hide is defined as the point where there is no visual difference between black and white areas on a Leneta Black & White Spray Monitor Form M71 which is adhered to the spray panel prior to spraying.

The results of the hiding power test are reported in Table 5. As can be seen, the pigment (Example 24A) has substantially improved hiding power as shown by much thinner film to reach full hide compared to the crumb rubber from Comparative Examples 24B-D.

TABLE 5

| Example | Resin | Film thickness at full hide (Mils]) |
|---|---|---|
| Example 24A | Laropal ® A-81 | 0.6 |
| Example 24B (Comparative) | Laropal ® A-81 | 3.1 |
| Example 24C (Comparative) | Laropal ® A-81 | 2.2 |
| Example 24D (Comparative) | Laropal ® A-81 | 3.5 |

Example 25 Refinish Paint System

Example 17 and Comparative Example 14 were incorporated into a solvent borne cellulose acetate butyrate/acrylate resin for a base coat, and sprayed on an aluminum panel. These correspond to Example 25A and Comparative Examples 25B, respectively.

Dry equivalent pigment (2.9 g) was dispersed in 45.7 g of the solvent-borne, cellulose acetate butyrate/acrylate basecoat resin and then mixed with butyl acetate to bring the total to 100.0 g. The samples were air sprayed onto aluminum panels and baked in an oven at 80° C.

Figure 2:
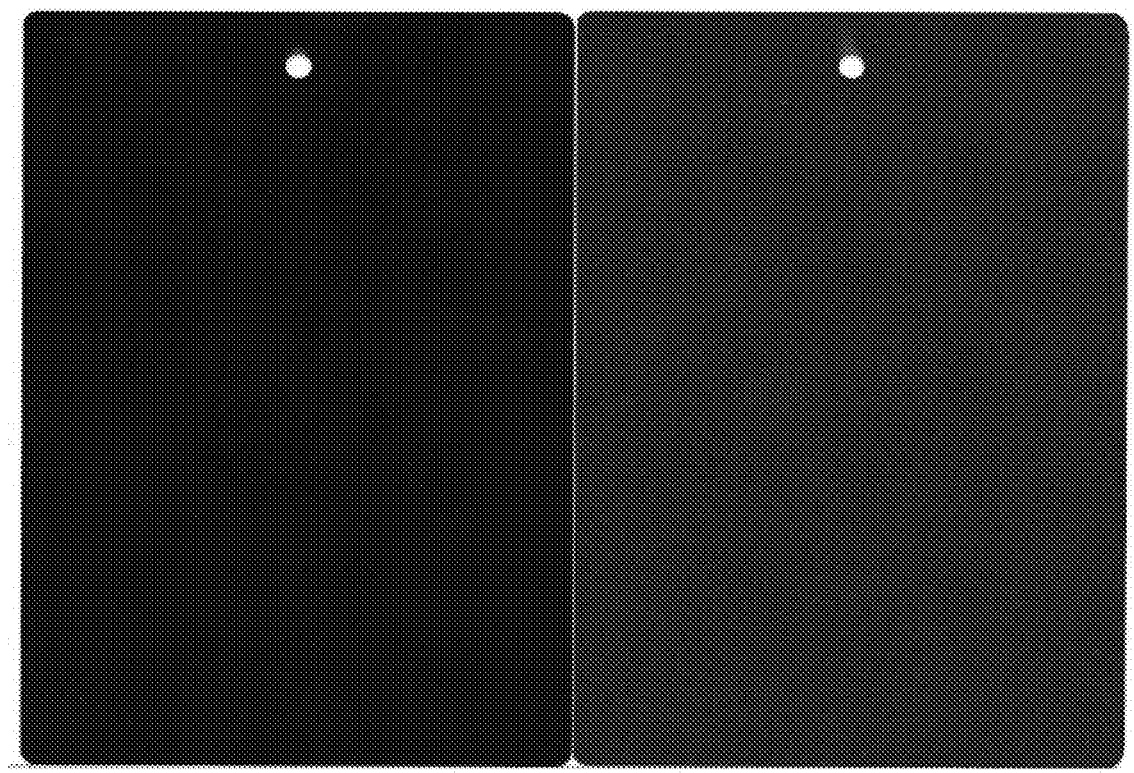
FIG. 2 is picture of panels of Example 25 that show blackness and smoothness differences. On the left is a panel made using Example 25A. On the right is a panel made using Example 25B.

The sprayed panel prepared from Example 25A appears and feels substantially smoother and is blacker than the panel sprayed with Example 25B. Pictures of both panels are shown in FIG. 2. The color of the sprayed panels were measured on an X-Rite MA-98 Spectrophotometer using D65/10 light. The reflected L* values measured at an incident angle, with respect to plane normal of 45° and an aspecular angle of) 45° (45°/0° were recorded and the L* and ΔL* values are recorded in Table 6. Table 6 shows the L* and ΔL* values at an incident/measuring angle of 45°/0° for Example 25A and Comparative Examples 25B-D.

TABLE 6

| Example | L*(45°) | ΔL* (45°) |
|---|---|---|
| Example 25A | 8.89 | Control |
| Example 25B (Comparative) | 10.19 | 1.2 |

The data in Table 6 demonstrate that Example 25A is blacker than Comparative Example 25B.

Example 26: Nitrocellulose Ink

Nitrocellulose based inks were prepared from Example 17 & Comparative Example 14 to produce Example 26A, and Comparative Example 26B. Pigment (20 g), isopropyl acetate (20 g), nitrocellulose varnish (60 g) and steel shot (200 g, ⅛") were added to an 8 oz. jar. The jars were sealed and shaken on a Harbil shaker for one hour. To complete the ink, 25 g isopropyl acetate was added and the mixture was stirred for one minute. Displays were prepared on uncoated paperboard stock with a #8 Meyer rod. The color of each of the nitrocellulose ink displays was measured on an X-Rite MA-98 Spectrophotometer using D65/10 light. The reflected L* values measured at an incident angle, with respect to plane normal of 45° and an aspecular angle of) 45° (45°/0° were recorded, and the L* and ΔL* values are recorded in Table 7.

TABLE 7

| Example | L*(45°) | ΔL* (45°) |
|---|---|---|
| Example 26A | 44.20 | Control |
| Example 26B (Comparative) | 85.39 | 41.19 |

Figure 3:
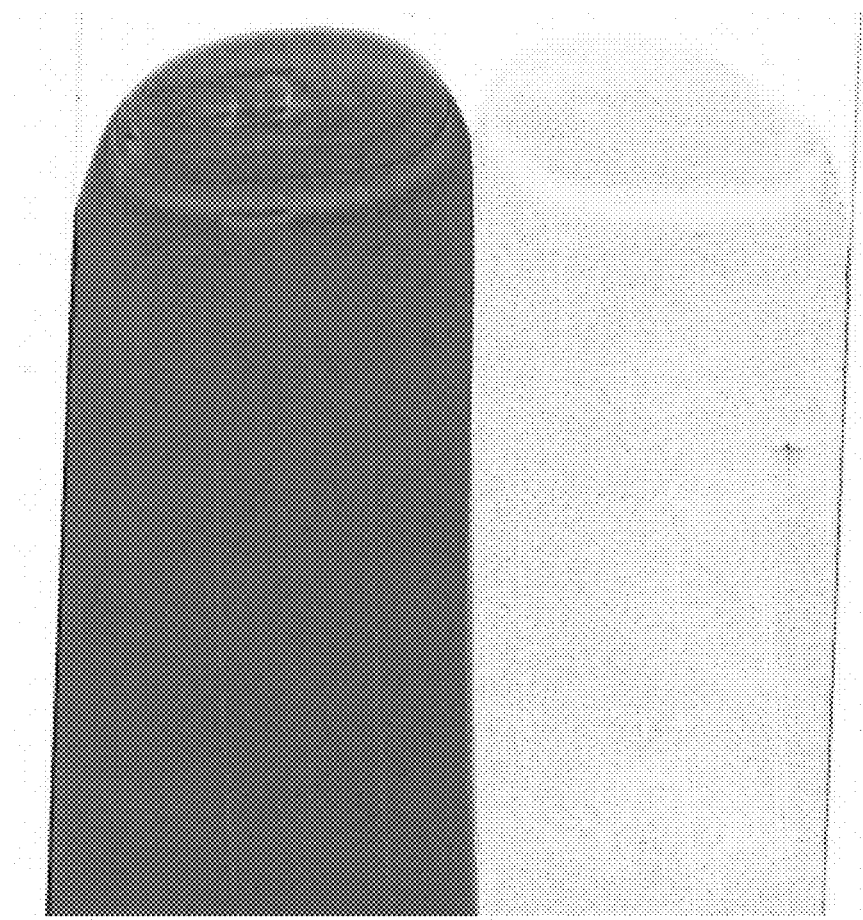
FIG. 3 is a picture of a display using nitrocellulose inks of Example 26A (left) and Comparative Example 26B (right).

The data in Table 7 demonstrate that Example 26A is clearly blacker and the display shows less particle aggregation than Comparative Example 26B. A picture of a typical display is shown in FIG. 3.

Example 27: Film Smoothness Measurement

Solvent-borne refinish coatings were prepared from Example 17 and Comparative Examples 14 and 15 to produce Example 27A and Comparative Examples 27B and 27C. Pigment (4.4 g), DeBeers Refinish Solvent-borne vehicle (68.3 g), and butyl acetate (adjusted to make coating formula equal 150 g) were added to an 8 oz. jar with 300 g or ⅛ inch steel media. The jars were sealed and shaken on a Red Devil shaker for one hour. The coating was sprayed to complete black and white hide on primed aluminum panels and cured for 1 hour at 100° C. The cured films were tested for surface smoothness using a Veeco—WYKO NT1100 Optical Profiler. The films were prepared for analysis by sputtering Au/Pd coating the films to reduce the standard deviation in the measurement. A 1.9 mm×2.4 mm area was analyzed using white light interference in VSI mode. The scan parameters were as: backscan—14 microns, length—100 microns, modulation—1%. The results are reported as the average roughness of all points from a plane fit to the test part surface, or $R_a$.

TABLE 8

| Example Number | Description | $R_a$ (microns) |
|---|---|---|
| Example 27A | Pigment from Example 17 | 1.9 |
| Example 27B | Pigment from Example 14 | 7.2 |
| Example 27C | Pigment from Example 15 | 10.6 |

Example 28: Adhesion Measurement

A water-borne coating was prepared from Example 17 and compared to the commercially available black coating from Sherwin-Williams. Example 28A was made by the following formula: pigment (8 g), Acrylic Multi-surface water-borne acrylic gloss finish vehicle Product Code B66-T-504 (70 g), water (4.4 g). This formulation was added to an 8 oz. jar with 300 g of ⅛ inch steel shot and shaken on a Red Devil shaker for 1 hour. The comparative Example 28B was custom black ultra-deep tone using B66-T-504 base. The films were prepared on unprimed aluminum panels with a BYK 10 mil gap and air dried. Once fully cured, the samples are tested using a Sutherland Rub Tester fitted with a 2 pound rub weight, onto which a double layer of paper towel is attached. The paper towel is saturated with 4 grams of Windex™ and the test panel is subjected to 100 revolutions of rub.

The adhesion was evaluated on a scale of 0 to 10. Table 9 shows the details of the scale. Example 28A has a gloss reduction of less than 75%, and Example 28B completely strips from the panel. Example 28A has an adhesion measurement of 5, and Example 28B has an adhesion measurement of 0.

TABLE 9

| Scale | Description |
|---|---|
| 0 | Film strips from panel, panel fully visible in the rub region |
| 2 | Film swells but does not strip from panel |
| 4 | Gloss reduction by 75% |
| 6 | Gloss reduction by 50% |
| 8 | Gloss reduction by 25% |
| 10 | No Gloss reduction |

Example 29: Viscosity of Coating

Water-borne acrylic coatings were prepared from Example 17 to make Examples 29A, 29B, 29C, 29D, 29E. The pigment was prepared at 5 different pigment to binder ratios according to Table 10. The formulas were added to an 8 oz. jar with 300 g of ⅛ inch steel media and shaken for 1 hour on a Red Devil shaker. The samples were put into 2 oz. jars and equilibrated to 25° C. The viscosity measurements were taken on a Brookfield LVDV-1 viscometer with a #4 spindle at 30 rpm.

TABLE 10

| | Vehicle (B66-T-504) (g) | Pigment/ binder ratio | Water (g) | Example 17 (g) | Viscosity (cPs) |
|---|---|---|---|---|---|
| Example 29A | 70 | 0.03 | 1.1 | 2.0 | 2680 |
| Example 29B | 70 | 0.06 | 2.2 | 4.0 | 2500 |
| Example 29C | 70 | 0.12 | 4.4 | 8.0 | 2020 |
| Example 29D | 70 | 0.20 | 7.3 | 13.2 | 1160 |
| Example 29E | 70 | 0.25 | 9.1 | 16.5 | 1120 |

Optical Microscopy:

The nitrocellulose inks from Examples 26A and 26B were diluted 20× with isopropanol, dropped on to a glass slide and allowed to dry. Images were taken using a Nikon Optiphot 2 optical microscope at 200× magnification.

Figure 4:
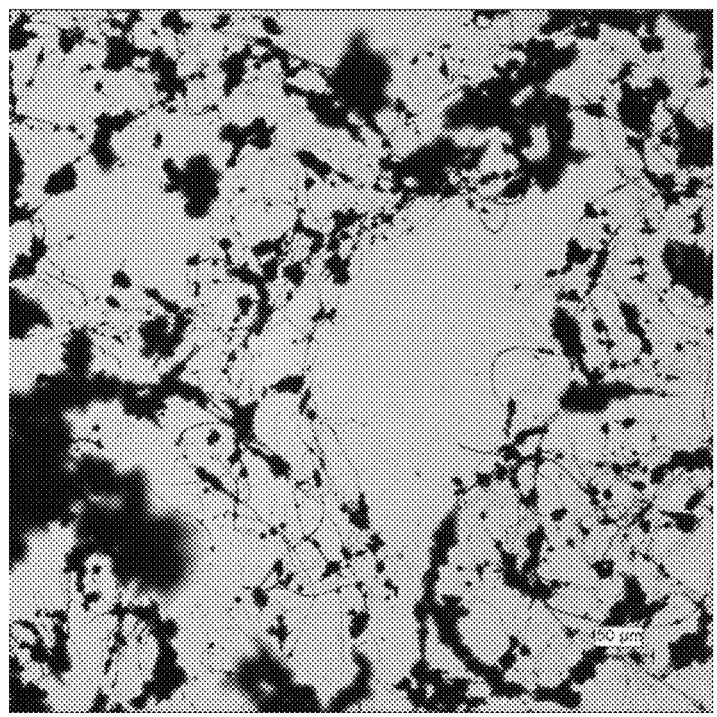
FIG. 4 includes optical microscopy images of Example 26A (top) and Comparative Example 26B (bottom) when they are dispersed in a nitrocellulose ink.
Figure 4:
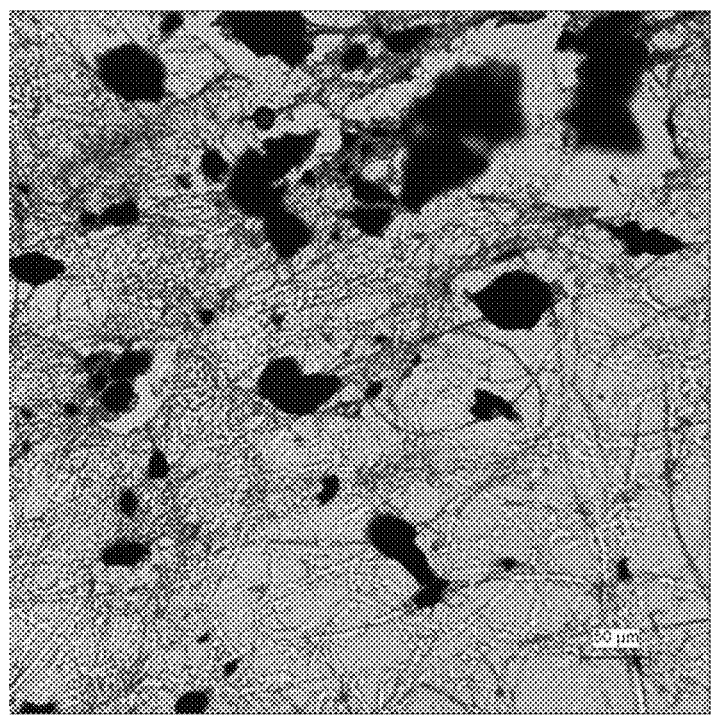

FIG. 4 shows typical microscopy images of the material in Example 26A and Comparative Example 26B. It can be observed from FIG. 4 that the particles in Comparative Example 26B are much bigger than those from Example 26A. Furthermore, the distribution of particles in Example 26A is much more uniform than in Comparative Example 26B. From these data, it is concluded that the pigment of Example 26A is more pigmentary than the crumb rubber of Comparative Example 26B.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A pigment comprising a milled elastomer, wherein the milled elastomer has a D50 particle size of between about 5 and about 30 microns and wherein the average roughness, $R_a$, of a coating of the pigment is about 3 microns or less.

2. The pigment of claim 1, wherein the D50 particle size is from about 5 to about 25 microns.

3. The pigment of claim 1, wherein the elastomer is vulcanized rubber from natural rubber, styrene-butadiene rubber, ethylene propylene diene monomer, or blends thereof.

4. The pigment of claim 1, wherein the tint strength of the pigment, as measured by draw down, has a color with an L* of about 82 or less.

5. The pigment of claim 1, wherein the required film thickness to produce full hide of a film, comprising the pigment, as measured by a spray evaluation of hiding power, is about 0.6 Mils or less.

6. The pigment of claim 1, wherein the viscosity of a coating comprising the pigment, before it dries, is less than 5000 cPS when measured at a pigment to binder level of 0.25.

7. The pigment of claim 1, wherein the adhesion measurement of a coating comprising the pigment on an unprimed aluminum panels is 6 or higher.

8. A dispersion comprising the pigment of claim 1 and a resin.

9. A pigment comprising a milled elastomer, wherein the milled elastomer has an D50 particle size of between about 5 and about 30 microns and wherein the average roughness, $R_a$, of a coating of the pigment is about 3 microns or less, and wherein the pigment is prepared by the steps comprising:
providing an elastomer; and
milling the elastomer in the presence of milling media and solvent at a temperature from about 30° C. to about 70° C.; wherein the elastomer is insoluble in the solvent.

10. The pigment of claim 9, wherein the solvent is selected from water, ethanol, n-propanol, 1-propanol, isopropanol, 1-butanol, 2-butanol, n-butanol, ethylene glycol, Butyl Cellosolve™ (ethylene glycol mono butyl ether), ethyl acetate, butyl acetate, dimethylformamide, dimethyl sulfoxide, and mixtures thereof.

11. The pigment of claim 9, wherein the diameter of the milling media is from about 0.5 mm to about 10 mm.

12. The pigment of claim 9, wherein the milling media has a density of about 2.5 to about 15 g/cm³.

13. The pigment of claim 9, wherein the elastomer is vulcanized rubber.

14. A dispersion comprising the pigment of claim 9 and a resin, wherein the resin is present during the milling step.

15. A method for preparing a pigment from an elastomer comprising the steps of:
providing an elastomer; and
milling the elastomer in a media mill in the presence of milling media and solvent at a temperature from about 30° C. to about 70° C.; wherein the diameter of the milling media is from about 0.5 mm to about 10 mm; wherein the elastomer is insoluble in the solvent; wherein the milled elastomer has a D50 particle size of between about 5 and about 30 microns and wherein the average roughness, $R_a$, of a coating of the pigment is about 3 microns or less.

16. The method of claim 15, wherein the milling media is spherical steel.

17. The method of claim 15, wherein the elastomer comprises vulcanized rubber.

18. The method of claim 15, wherein the resulting milled elastomer has a D50 particle size of between about 5 and about 25 microns.

19. The method of claim 15, wherein the solvent is selected from water, ethanol, n-propanol, 1-propanol, isopropanol, 1-butanol, 2-butanol, n-butanol, ethylene glycol, Butyl Cellosolve™ (ethylene glycol mono butyl ether), ethyl acetate, butyl acetate, dimethylformamide and dimethyl sulfoxide.

20. The method of claim 15, wherein a resin is present during the milling step.

* * * * *